(12) United States Patent
Jung

(10) Patent No.: US 8,047,129 B2
(45) Date of Patent: Nov. 1, 2011

(54) APPARATUS FOR DISINFECTING SEEDS USING HOT WATER

(76) Inventor: Ji Hyun Jung, Pyeongtaek-si (KR)

( * ) Notice: Subject to any disclaimer, the term of this patent is extended or adjusted under 35 U.S.C. 154(b) by 360 days.

(21) Appl. No.: 12/431,978

(22) Filed: Apr. 29, 2009

(65) Prior Publication Data

US 2010/0107901 A1    May 6, 2010

(30) Foreign Application Priority Data

May 7, 2008    (KR) .................. 10-2008-0042517

(51) Int. Cl.
*A23L 3/16* (2006.01)

(52) U.S. Cl. ............ 99/483; 99/486; 426/507; 426/519; 426/521

(58) Field of Classification Search .................... 99/467, 99/486, 485; 426/506–507, 519, 520–521
See application file for complete search history.

(56) References Cited

U.S. PATENT DOCUMENTS

| | | | | | |
|---|---|---|---|---|---|
| 1,513,174 | A | * | 10/1924 | Kruger ........................... | 99/483 |
| 2,173,411 | A | * | 9/1939 | De Jonge ...................... | 426/521 |
| 3,615,599 | A | * | 10/1971 | Sakamoto et al. ............... | 201/7 |
| 4,062,646 | A | * | 12/1977 | Lodige et al. ................... | 422/26 |
| 4,309,829 | A | * | 1/1982 | Tesch et al. .................... | 34/361 |
| 5,386,764 | A | * | 2/1995 | Ratajczek ...................... | 99/483 |
| 5,860,356 | A | * | 1/1999 | Kageyama .................... | 99/330 |
| 5,997,930 | A | * | 12/1999 | Kendall et al. ................. | 426/460 |
| 7,357,954 | B2 | * | 4/2008 | Kanemoto et al. ............. | 426/507 |
| 2003/0061943 | A1 | * | 4/2003 | Tippmann, Sr. ................ | 99/467 |
| 2004/0105920 | A1 | * | 6/2004 | Isobe et al. .................... | 426/331 |
| 2005/0031750 | A1 | * | 2/2005 | Imura ........................... | 426/519 |
| 2005/0249650 | A1 | * | 11/2005 | Damhuis et al. ............... | 422/295 |

FOREIGN PATENT DOCUMENTS

| | | | | |
|---|---|---|---|---|
| JP | 2003235309 | A | * | 8/2003 |
| JP | 2004000261 | | | 1/2004 |
| JP | 2005269940 | A | * | 10/2005 |
| JP | 2006280387 | | | 10/2006 |
| JP | 2007151406 | A | * | 6/2007 |
| JP | 2007289109 | | | 11/2007 |
| KR | 10200813664 | | | 8/2009 |

* cited by examiner

*Primary Examiner* — Stephen L. Blau
(74) *Attorney, Agent, or Firm* — Robert W. Becker; Robert Becker & Associates

(57) ABSTRACT

An apparatus for disinfecting seeds using hot water. The apparatus includes a disinfection container for holding water. A hopper feeds seeds into the disinfection container. A heater heats the water in the disinfection container. A temperature sensor detects a temperature of the water. A control box controls the heater in response to a detected signal. A cylindrical hot-water circulation chamber moves the seeds from the hopper to the lower portion of the disinfection container. A water jetting pipe jets water fed from a circulation pump towards the upper portion of the hot-water circulation chamber, thus dispersing the seeds. A storage tube temporarily stores the seeds. A feed tube feeds the seeds from the storage tube to the outside. An air jetting pipe jets compressed air from an air pump and discharges the compressed air to an inlet of the feed tube.

2 Claims, 1 Drawing Sheet

APPARATUS FOR DISINFECTING SEEDS USING HOT WATER

BACKGROUND OF THE INVENTION

1. Field of the Invention

The present invention relates generally to an apparatus for disinfecting a variety of seeds including rice seeds, pepper seeds, melon seeds, pumpkin seeds, and watermelon seeds and, more particularly, to an apparatus for disinfecting seeds using hot water, which is capable of evenly and continuously disinfecting all kinds of seeds which may be disinfected using hot water, by using hot water of a temperature required for disinfection over a required period of time.

2. Description of the Related Art

Generally, a disinfectant is used to disinfect rice seeds and other seeds before sowing. In the case of using the disinfectant, the disease-causing microorganisms present on the outside of a seed can be killed. However, the disease-causing microorganisms present inside the shell of the seed are not disinfected. In bad cases, farming may be ruined.

Meanwhile, in order to disinfect seeds, a method for disinfecting seeds using hot water may be used. According to this conventional method, seeds are put into a bag comprising a net, and the bag is put into a large container which is filled with water at 60☐. After the seeds are disinfected for about 10 to 15 minutes, the bag is taken out of the container. This disinfecting method complies with the principle of destroying microorganisms using hot water by putting seeds into the hot water.

In such a disinfecting method, the seeds must make contact with the water in the container. But, the area making contact with the water of seeds located at the inner position of the bag is greatly different from that of seeds located at the outer position of the bag.

That is, when the temperature of water is set at a disinfection temperature (e.g. 60☐ to 65☐), the seeds located at the outer position contact water of the disinfection temperature, so that the quality of the seeds becomes good. However, the seeds located at the inner position contact water having a temperature which is lower than the disinfection temperature, so that the quality of the seeds is not positively impacted.

Conversely, when the temperature of water is set to be high such that the seeds located at the inner position contact water at the disinfection temperature, the quality of the seeds located at the inner position becomes good. However, the seeds located at the outer position contact water, the temperature of which is too high, so that the seeds are cooked and thus lose their function.

The conventional method for disinfecting seeds using hot water is problematic in that all seeds cannot evenly make contact with water at a required disinfection temperature, so that it is difficult to obtain seeds which have a uniformly good quality.

In order to solve the problem, Korean Patent Appln. No. 10-2008-13664, entitled "Apparatus for Disinfecting Seeds using Hot Water", has been proposed by the inventor of the present invention. According to the cited document, seeds to be disinfected, for example rice seeds, are put into a hopper, and an input regulator is opened, so that the seeds drop through a guide pipe little by little. Subsequently, the disinfection of the seeds is started using hot water. However, even after the seeds drop into the guide pipe by gravity, some of the seeds conglomerate and contact each other. Thus, it is difficult to evenly disinfect all seeds at a proper disinfection temperature.

Further, this disinfecting apparatus is problematic in that seeds are jammed between screw blades while the seeds are fed by a feed screw, so that the seeds are broken and thus lose their function.

SUMMARY OF THE INVENTION

Accordingly, the present invention has been made keeping in mind the above problems occurring in the prior art, and an object of the present invention is to provide an apparatus for disinfecting seeds using hot water, which allows all of the seeds disinfected using hot water to have a uniformly good quality, without peeling husks from the seeds which are treated using hot water at a required disinfection temperature for the period of time required for disinfection.

In order to accomplish the above object, the present invention provides an apparatus for disinfecting seeds using hot water, including a disinfection container for holding water used to disinfect the seeds, a hopper for feeding the seeds into the disinfection container, a heater for heating the water held in the disinfection container, a temperature sensor for detecting a temperature of the water held in the disinfection container, a control box for controlling the heater in response to a signal detected by the temperature sensor, a cylindrical hot-water circulation chamber for moving the seeds from the hopper to the lower portion of the disinfection container, holes being formed in the upper portion of the hot-water circulation chamber at regular intervals and having size which permits passage of the water but prevents passage of the seeds, a water jetting pipe for jetting water fed from a circulation pump towards the upper portion of the hot-water circulation chamber, thus dispersing the seeds which move downwards in the hot-water circulation chamber by gravity, a storage tube having a large diameter and connected to a lower end of the hot-water circulation chamber to temporarily store the seeds, a feed tube extending upwards from the lower portion of the disinfection container and feeding the seeds from the storage tube to an outside of the disinfection container, and an air jetting pipe for jetting compressed air from an air pump and discharging the compressed air to an inlet of the feed tube.

A seed filter may be provided at a predetermined position of an upper end of the disinfection vessel in such a way as to be inclined downwards and outwards, and functions to remove water from the seeds falling from an outlet formed in an upper end of the feed tube.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Hereinafter, the preferred embodiment of the present invention will be described in detail with reference to the accompanying drawings.

Figure 1:
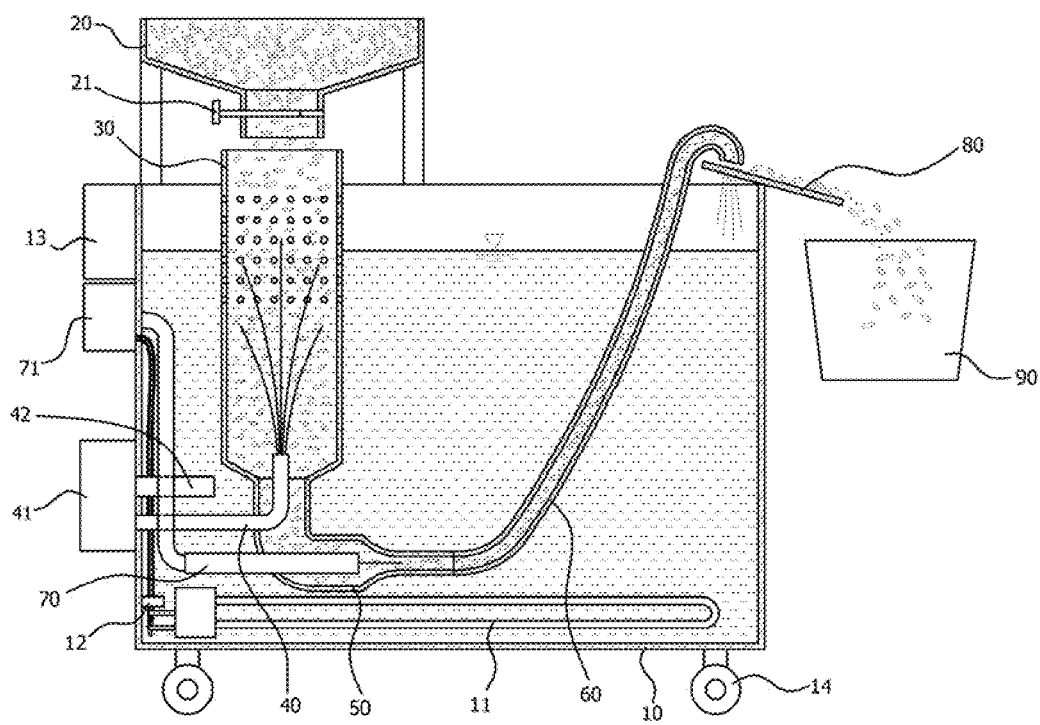
FIG. 1 is a vertical sectional view illustrating an apparatus for disinfecting seeds using hot water according to the present invention.
Figure 2:
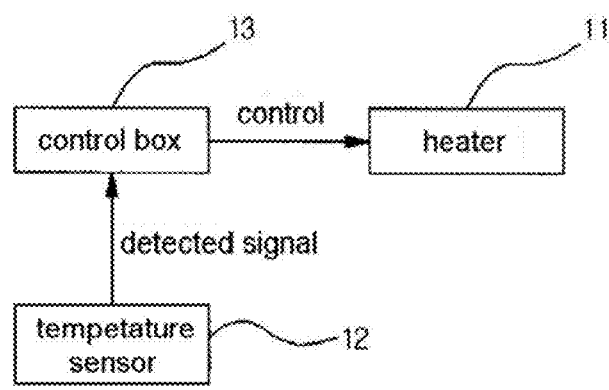
FIG. 2 is a control block diagram of the apparatus for disinfecting seeds using hot water according to the present invention.

FIG. 1 is a vertical sectional view illustrating an apparatus for disinfecting seeds using hot water according to the present invention, and FIG. 2 is a control block diagram of the apparatus for disinfecting seeds using hot water according to the present invention.

As shown in the drawings, the apparatus for disinfecting seeds using hot water according to the present invention includes a disinfection container 10, a hopper 20, a hot-water circulation chamber 30, a water jetting pipe 40, a storage tube 50, a feed tube 60, and an air jetting pipe 70.

The disinfection container 10 is a container which holds water for disinfecting seeds. Water is heated in the disinfection container 10, and various seeds such as rice seeds are disinfected by the heated water.

A heater 11 is installed in the lower portion of the disinfection container 10 so as to heat water. Further, a temperature sensor 12 is installed at a predetermined position in the disinfection container 10 to detect the temperature of water in the disinfection container 10.

Further, a control box 13 is installed on the exterior at a predetermined position of the disinfection container 10, and detects the temperature of water in response to a signal from the temperature sensor 12 and controls the heater 11 such that the temperature of water reaches a preset temperature.

The hopper 20 is mounted to the top of the disinfection container 10 via support columns and functions to feed seeds into the disinfection container 10. An input regulator 21 is provided on the lower portion of the hopper 20 to regulate the input of the seeds.

The input regulator 21 adjusts the size of an opening through which the seeds fed downwards from the hopper 20 fall because of gravity, thus regulating the input of the seeds.

The hot-water circulation chamber 30 has a cylindrical shape, and moves the seeds downwards from the hopper 20 to the lower portion of the disinfection container 10. Holes are formed at regular intervals in the upper portion of the hot-water circulation chamber 30 and have a size which permits the passage of water but prevents the passage of the seeds.

The water jetting pipe 40 functions to disperse the seeds dropping into the hot-water circulation chamber 30 because of gravity. One end of the water jetting pipe 40 is provided external to the disinfection container 10 and is connected to the water outlet of a circulation pump 41 which is connected at its predetermined portion to a water inlet pipe 42.

The other end of the water jetting pipe 40 passes through a through hole formed in the storage tube 50 which will be described below in detail and is connected to the lower portion of the hot-water circulation chamber 30, and then is bent perpendicularly towards the interior of the hot-water circulation chamber 30 so as to jet water from the lower portion to the upper portion of the hot-water circulation chamber 30, thus evenly dispersing the seeds.

The storage tube 50 having a large diameter is connected to the lower end of the hot-water circulation chamber 30 and temporarily stores the seeds. The storage tube 50 is bent into an 'L' shape. The upper end of the storage tube 50 extending in a vertical direction is connected to the lower end of the hot-water circulation chamber 30. The lower end of the storage tube 50 extending in a horizontal direction is formed such that its diameter is gradually reduced, thus forming an inclined part. The lower end of the feed tube 60 which will be described below in detail is connected to the lower end of the inclined part.

The feed tube 60 extends from the lower portion to the upper portion of the disinfection container 10, thus feeding the seeds from the storage tube 50 to the outside of the disinfection container 10. The feed tube 60 is secured to the disinfection container 10 in such a way as to be inclined upwards. An outlet which is bent downwards is provided on the upper end of the feed tube 60.

The air jetting pipe 70 jets compressed air from an air pump 71 installed on the exterior of the disinfection container 10 to the inlet of the feed tube 60. The compressed air is jetted through the air jetting pipe 70 into the feed tube 60, so that the seeds fed through the inlet of the storage tube 50 are fed through the outlet of the feed tube 60 to a seed filter 80.

One end of the air jetting pipe 70 is connected to the air outlet of the air pump 71, while the other end of the air jetting pipe 70 passes through a through hole formed in the storage tube 50 and extends horizontally to the interior of the feed tube 60.

The seed filter 80 is installed at a predetermined position on the upper end of the disinfection container 10 to receive the seeds falling from the outlet of the feed tube 60, and is inclined downwards such that water on the seeds drops into the disinfection container 10 and the seeds from which water has been to some extent eliminated fall into a seed storage container 90.

Reference numeral 14 denotes wheels which are mounted to the bottom of the disinfection container 10.

The seed disinfecting apparatus using hot water according to the present invention constructed as described above is operated as follows.

The temperature (e.g. 60☐ to 65☐) of water is previously set in the control box 13, and the heater 11 is operated to heat water held in the disinfection container 10. The control box 13 detects the temperature of water in response to a signal detected by the temperature sensor 12, and controls the heater 11 so at to heat water to 60☐ to 65☐.

Once water is heated to a desired temperature, the circulation pump 41 and the air pump 71 are actuated. Seeds to be disinfected such as rice seeds are put into the hopper 20, and the input regulator 21 is opened so that the seeds drop into the hot-water circulation chamber 30 little by little.

Since water flows through the plurality of holes formed in the upper portion of the hot-water circulation chamber 30 into the chamber 30, the seeds are disinfected by hot water during the downward movement. At this time, water is jetted to the upper portion of the hot-water circulation chamber 30 via the water jetting pipe 40, so that the seeds are dispersed. Thereby, the seeds are more smoothly and evenly disinfected by hot water.

The process of jetting water into the hot-water circulation chamber 30 through the water jetting pipe 40 is as follows. That is, heated water held in the disinfection container 10 is fed through the water inlet pipe 42 connected to the circulation pump 41 into the circulation pump 41, and thereafter the heated water is jetted through the water jetting pipe 40 into the hot-water circulation chamber 30. This process is performed repetitively and continuously.

When the seeds are discharged from the lower end of the hot-water circulation chamber 30, the seeds enter the inlet of the storage tube 50 which temporarily stores the seeds. As the air is jetted from the air pump 71 through the air jetting pipe 70, the seeds move upwards from the storage tube 50 along the feed tube 60. When the seeds reach the upper end of the feed tube 60, the seeds are discharged through the outlet provided on the upper end of the feed tube 60.

Water included in the seeds falling through the outlet to the seed filter 80 drops into the disinfection container 10 again. After the water is removed from the seeds, the seeds fall into the seed storage container 90 which is located under the seed filter 80.

It takes 10 to 15 minutes for the seeds to drop into the water of the hot-water circulation chamber 30 and move out of the feed tube 60.

The disinfection time and amount of seeds may be controlled by the air pump 71 and the circulation pump 41.

As such, the seed disinfecting apparatus using hot water according to the present invention prevents all seeds from colliding with other objects during the disinfection, thus preventing husks from peeling from the seeds, and disinfects evenly dispersed seeds for a required disinfection time using hot water of a proper disinfection temperature, thus providing seeds of good and uniform quality.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As described above, the present invention provides an apparatus for disinfecting seeds using hot water, in which all seeds are disinfected using hot water of a proper disinfection temperature for a period of time required for disinfection with the seeds being dispersed by a water jetting pipe and an air jetting pipe, thus preventing husks from peeling from the seeds, therefore retaining the function as the seeds, and allowing all the seeds to have good and uniform quality.

The specification incorporates by reference the disclosure of Korean priority document 10 2008 0042517 filed May 7, 2008.

The present invention is, of course, in no way restricted to the specific disclosure of the specification and drawings, but also encompasses any modifications within the scope of the appended claims.

What is claimed is:

1. An apparatus for disinfecting seeds using hot water, comprising:
   a disinfection container for holding water used to disinfect the seeds;
   a hopper for feeding the seeds into the disinfection container;
   a heater for heating the water held in the disinfection container;
   a temperature sensor for detecting a temperature of the water held in the disinfection container;
   a control box for controlling the heater in response to a signal detected by the temperature sensor;
   a cylindrical hot-water circulation chamber for moving the seeds from the hopper to a lower portion of the disinfection container, holes being formed in an upper portion of the hot-water circulation chamber at regular intervals and having a size which permits passage of the water therethrough but prevents passage of the seeds therethrough;
   a water jetting pipe for jetting water fed from a circulation pump towards the upper portion of the hot-water circulation chamber, thus dispersing the seeds which move downwards in the hot-water circulation chamber by gravity;
   a storage tube having a large diameter and connected to a lower end of the hot-water circulation chamber to temporarily store the seeds received therefrom;
   a feed tube extending upwards from the lower portion of the disinfection container, and feeding the seeds from the storage tube to an outside of the disinfection container; and
   an air jetting pipe for jetting compressed air from an air pump, and discharging the compressed air to an inlet of the feed tube.

2. The apparatus as set forth in claim 1, wherein a seed filter is provided at a predetermined position of an upper end of the disinfection container in such a way as to be inclined downwards and outwards, wherein the seed filter functions to remove water from the seeds falling from an outlet formed in an upper end of the feed tube.

* * * * *